United States Patent
Knoch et al.

(10) Patent No.: US 8,074,596 B2
(45) Date of Patent: Dec. 13, 2011

(54) APPARATUS FOR FORMING A SHEATH OVER AN ELONGATE MEMBER, EXTRUDER SYSTEM AND METHOD OF MANUFACTURING A FIBER OPTIC CABLE

(75) Inventors: Horst Knoch, Coburg (DE); Gerhard Merbach, Neustadt bei Coburg (DE); Allen M. Miller, Newton, NC (US); Gunter Wunsch, Neustadt bei Coburg (DE)

(73) Assignee: Corning Cable Systems LLC, Hickory, NC (US)

( * ) Notice: Subject to any disclaimer, the term of this patent is extended or adjusted under 35 U.S.C. 154(b) by 1081 days.

(21) Appl. No.: 11/796,890

(22) Filed: Apr. 30, 2007

(65) Prior Publication Data
US 2008/0268141 A1    Oct. 30, 2008

(51) Int. Cl.
*B05C 3/12*    (2006.01)
*B05C 3/00*    (2006.01)
*B05C 11/00*   (2006.01)

(52) U.S. Cl. ......... 118/420; 118/429; 118/405; 118/667

(58) Field of Classification Search .................. 118/420, 118/429, 405, 125, 666, 667, DIG. 18, DIG. 19; 427/163.2; 425/113, 114; 385/110, 112, 385/113; 264/1.29
See application file for complete search history.

(56) References Cited

U.S. PATENT DOCUMENTS

| | | | | | |
|---|---|---|---|---|---|
| 2,811,746 | A | * | 11/1957 | Lerch | 118/68 |
| 2,973,552 | A | * | 3/1961 | Downing | 118/65 |
| 3,944,459 | A | * | 3/1976 | Skobel | 156/461 |
| 4,068,615 | A | * | 1/1978 | LeNir | 118/665 |
| 5,063,016 | A | | 11/1991 | Bauer et al. | 264/211.21 |
| 6,045,876 | A | * | 4/2000 | Fellers et al. | 427/434.4 |
| 2007/0006961 | A1 | * | 1/2007 | Kusek | 156/169 |

FOREIGN PATENT DOCUMENTS

| | | |
|---|---|---|
| DE | 4318304 A1 | 12/1994 |
| EP | 1146373 A1 | 10/2001 |
| GB | 2134842 A | 8/1984 |
| JP | 54-146860 | 11/1979 |
| JP | 59-24633 | 2/1984 |

OTHER PUBLICATIONS

Patent Cooperation Treaty, International Search Report for International Application No. PCT/US2008/004345, Jul. 24, 2008, 2 pages.

* cited by examiner

*Primary Examiner* — Yewebdar Tadesse
(74) *Attorney, Agent, or Firm* — C. Keith Montgomery

(57) ABSTRACT

An apparatus and a method for forming a sheath over an elongate member comprises an extruder that has an output to supply a melt material having a temperature. A heat exchanger connected downstream the output of the extruder removes heat from the melt material in a controlled manner. An elongate member, which may be a cable core, is supplied to a crosshead that is connected downstream the heat exchanger to surround the elongate member with a sheath of the melt material.

19 Claims, 4 Drawing Sheets

APPARATUS FOR FORMING A SHEATH OVER AN ELONGATE MEMBER, EXTRUDER SYSTEM AND METHOD OF MANUFACTURING A FIBER OPTIC CABLE

FIELD OF THE INVENTION

The present invention concerns apparatus and method for forming a sheath over an elongate member that use an extruder. In particular, an apparatus and a method is concerned to extrude a cable jacket over an optical fiber cable core.

BACKGROUND OF INVENTION

In the field of cable manufacturing, a cable core includes elements to transmit optical and/or electrical signals that may be optical waveguides or electrical wires. The optical waveguides may be grouped together and surrounded by a sheath of polymer material to form a buffer tube. For instance, one or more buffer tubes may be grouped together within a cable core. The cable core is surrounded by a cable jacket that may be made of polymer material. In order to manufacture, in a first step, the sheath of the buffer tube around the optical fibers and, in a second step, the jacket around the cable core, a process of providing a melt polymer material and disposing the polymer material at an elevated temperature around the optical fibers and the cable core, respectively, in a crosshead is a commonly used method. In general, extruding polymer materials over elongate members may be used in other technical fields as well.

In particular with optical fiber cable technology, the optical fibers are sensitive to thermal and/or mechanical stress so that the manufacturing process must be performed under controlled conditions to meet sensitivity requirements. In particular, the optical performance may suffer from excess process temperature.

SUMMARY OF THE INVENTION

Accordingly, it is desirable, when extruding a polymer material over an elongate member, to perform the extruding process under conditions that avoid an adverse effect on the elongate member.

According to an embodiment, an apparatus for forming a sheath over an elongate member comprises an extruder having an output to supply a melt material having a temperature; a heat exchanger connected downstream the output of the extruder to one of add heat to and remove heat from the melt material in a controlled manner; a crosshead connected downstream the heat exchanger to provide an elongate member with a sheath that surrounds the elongate member.

According to another embodiment, an apparatus for extruding a jacket over an elongate optical fiber core comprises an extruder to supply a polymer material at an elevated temperature; a crosshead; and a cooling system, said cooling system being connected between said extruder and said crosshead to supply said crosshead with the polymer material at a less elevated temperature.

According to another embodiment, an extruder system comprises an extruder to provide a material; a heat exchanger coupled downstream the extruder to one of add thermal energy to and remove thermal energy from said material; a supply reel to supply an elongate member; a tool designed to receive the elongate member and coupled downstream said heat exchanger to provide the elongate member with a sheath surrounding the elongate member.

According to an aspect, a method for treating an elongate member comprises supplying a melt material having a temperature; lowering the temperature of the melt material in a controlled manner, supplying an elongate member; then extruding the melt material over the elongate member; and solidifying the melt material.

According to an embodiment of the aspect, a method of manufacturing a fiber optic cable comprises supplying an optic fiber core, said optic fiber core comprising a fiber optic transmission element; supplying a melt polymer material at an elevated temperature; cooling the melt polymer material to a lower temperature in a controlled manner; then disposing the melt polymer material over the fiber optic core.

According to another embodiment of the aspect, a method for manufacturing a fiber optic cable comprises paying of a cable core comprising an optical transmission element comprising at least an optical fiber and a polymer sheath surrounding the optical fiber; generating a polymer material having a temperature; lowering the temperature of the polymer material; disposing the polymer material about the cable core; cooling the polymer material disposed about the cable core; and spooling the cable on a drum.

BRIEF DESCRIPTION OF THE DRAWINGS

The above described embodiments and aspects will be explained hereinafter in a more detailed fashion with reference to the accompanying drawings.

DETAILED DESCRIPTION OF THE INVENTION

Figure 1:
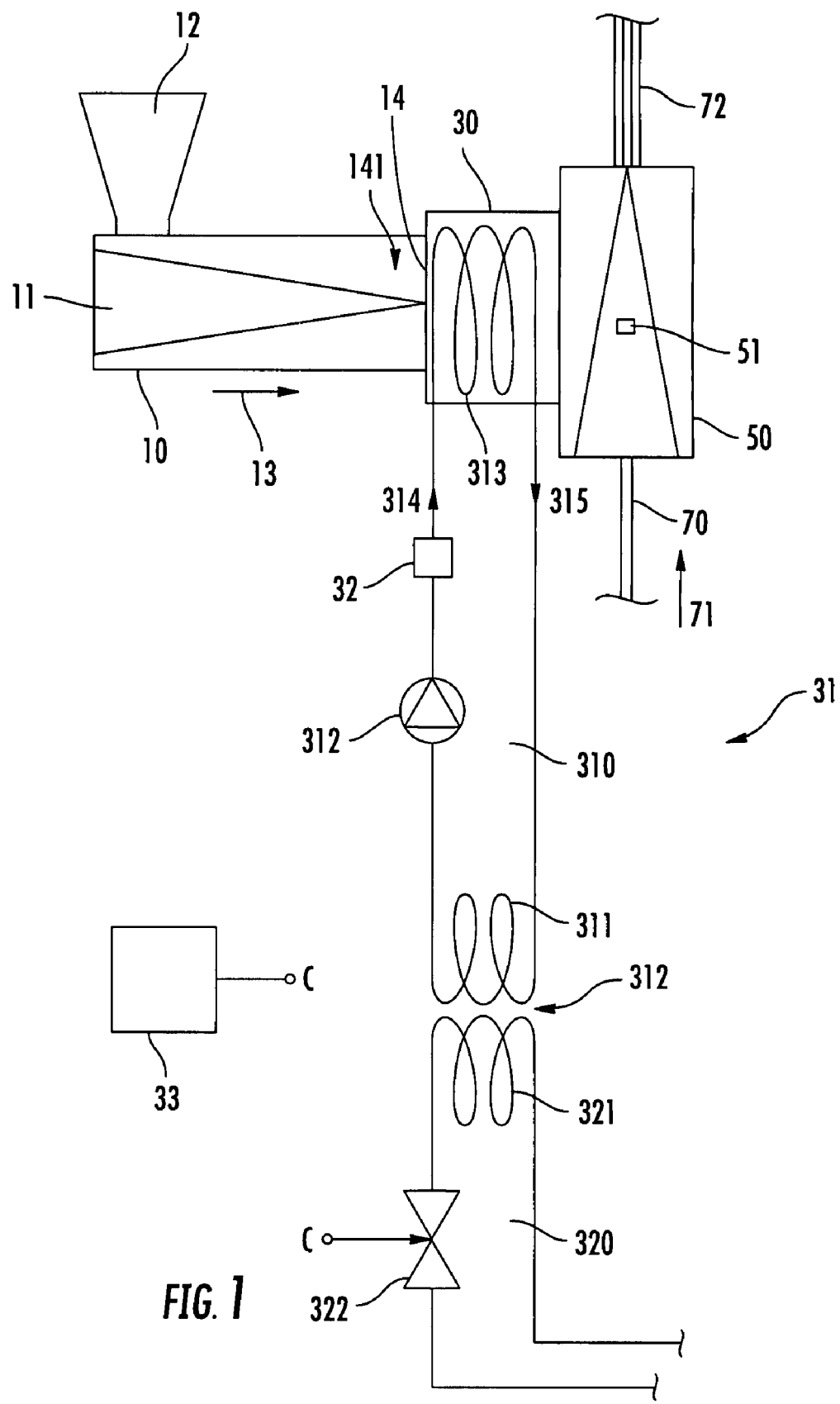
FIG. 1 shows an embodiment of an apparatus for extruding a sheath over an elongate member.

Embodiments of the present invention will now be described more fully hereinafter with reference to the accompanying drawings. The invention may, however, be embodied in many different forms and should not be construed as limited to the embodiments set forth herein; rather, these embodiments are provided so that the disclosure will fully convey the scope of the invention to those skilled in the art. The drawings are not necessarily drawn to scale but are configured to clearly illustrate the invention. The same reference signs will be used for the same or corresponding elements in different figures.

In general, during an extruding process, a polymer material granulate is supplied to an extruder. The extruder has a screw that is driven with a predetermined rotational speed, for example, measured in rotations per minute (RPM). The material supplied to the extruder can be heated for melting. Since the extruder screw has a considerable rotational speed in the range of a hundred or several hundreds RPM, the melt material advancing along the extruder screw is set under considerable pressure and is heated further by the applied friction and pressure. In conventional systems, the extruder output is forwarded directly into a crosshead in order to extrude the melt polymer material over an elongated member that is supplied transversely to the crosshead. The elongate member may be a cable core to be supplied with a cable jacket.

Conventional extruders may have a temperature sensor coupled to the extruder housing that provides an indication for the heat of the melt polymer material currently present in the extruder housing. For manufacturing cables, it is desired to achieve a considerable line speed to keep manufacturing costs reasonable. Increasing the RPM of the extruder screw increases the line speed. As it turned out, however, the measurement sensor coupled to the housing of the extruder shows a temperature that is different from the temperature actually present in the center of the melt polymer material in the interior of the bulk material. The increasing of the RPM of the extruder screw in order to achieve a high manufacturing speed may generate a temperature of the melt polymer material that adversely affects the characteristic of the optical fiber and/or of the elements in a fiber optic cable. For example, the optical characteristics of the fiber may change in response to the excess heat. Furthermore, the sub-components within the optical fiber cable may stick or glue to each other.

For example, a fiber optic cable may comprise a buffer tube having a group of one or more optical fibers surrounded by a polymer sheath tube material that is prefabricated and that is subsequently provided with a material in the extruder crosshead to form the cable jacket. With a temperature of the polymer material for extruding the cable jacket in a range of, e.g. 300° C., the material of the buffer tube may melt again and stick to the extruded cable jacket. Relative movement between the elements within a cable may be inhibited when buffer tube and cable jacket stick to each other so that optical performance of the cable may suffer. Other problems may also arise when the temperature of the extruded material is in excess of a certain limit.

FIG. 1 shows an embodiment for an extrusion apparatus that achieves controlled temperature conditions for the melt polymer material. In particular, the apparatus may avoid an excess temperature of the polymer material so that the temperature lies within a predefined range or at a predefined substantially constant temperature. FIG. 1 shows an extruder 10 having an extruder screw 11 that rotates at a suitable rotational speed. A supply tank 12 provides a polymer granulate or pellets as an input to the extruder 10. While supplying material from tank 12 to the extruder 10 and maintaining a suitable rotational speed for extruder screw 11, the polymer material will achieve a temperature higher than the melting temperature of the polymer material and will transfer from solid to melt state. Additional heating of the polymer material upon entering the extruder housing may also be useful. The polymer screw causes advancement of the material along the direction indicated with arrow 13. At the end 14 of the extruder screw 11, the melt polymer material may have a temperature within the bulk material, for example, in the range of about 300° C. and will achieve a pressure, for example, in the range up to 450 to 500 bar. Downstream the extruder end 14 is connected a heat exchanger 30 that removes heat or thermal energy from the melt polymer material that is forwarded into the heat exchanger 30. Downstream the heat exchanger 30 is disposed an extruder crosshead 50 that extrudes a sheath over the elongate member 70 supplied to the extruder 50.

The heat exchanger 30 is disposed within a cooling system 31 that removes heat or thermal energy from the polymer melt that flows along direction 13 through the heat exchanger 30. In other applications, it may be desirable that the heat exchanger 30 adds heat or thermal energy to the polymer material when advancing in direction 13 through the heat exchanger 30. In any of both cases, during one of adding heat to or removing heat from the melt polymer material, the addition/removal of heat is performed in a controlled manner.

The removal of heat of thermal energy will maintain or lower the temperature of the polymer material when passing through the heat exchanger 30. The addition of heat or thermal energy will maintain or increase the temperature of the polymer material when passing through the heat exchanger 30.

The cooling loop 31 generates a flow of a cooling medium through a coil 313 that is a channel for the cooling medium that is wrapped around the polymer material flow area within heat exchanger 30. The coil 313 may be disposed in the sidewalls of the housing of the heat exchanger 30. The cooling medium is supplied into the coil indicated with arrow 314 and removed from the coil indicated with arrow 315 to establish a flow of cooling medium through the coil 313. The cooling medium through coil 313 may be an oil. In the embodiment, the coil 313 is part of a closed loop 310 of a cooling oil flow. The loop 310 further comprises a pump 312 which generates a desired flow speed of the cooling oil through the channel and through coil 313, for example, at a constant cooling medium flow speed. The loop 310 is closed with a coil 311 that is a portion of another heat exchanger 312. The other side of the heat exchanger 312 includes another coil 321 that is thermally coupled to coil 311 of closed loop 310. Loop 312 is part of a cooling medium flow system 320 that may have a cooling medium different from the cooling medium of loop 310. The cooling medium of cooling medium flow system 320 may be conventional water. The cooling medium flow system 320 can be coupled to a water supply. In dependence on the temperature to be achieved in the polymer material when passing through heat exchanger 30, a valve 322 disposed within the flow system 320 is controlled on and off or controlled intermittently in dependence on a control signal C.

The above described control path comprising first cooling medium flow loop 310 including heat exchanger 30 as well as second cooling medium flow system 320 operates to achieve a temperature at the output of the heat exchanger 30, which temperature is well controlled within a certain range or at a certain constant temperature. The desired temperature is, for example, taken with temperature sensor 51 that is disposed within the crosshead 50. A signal from temperature sensor 51 is supplied to a controller 33, which may be a microprocessor or a computer based device. Additional signals may also be supplied to controller 33, for example, the temperature of the melt polymer material before entering the heat exchanger 30 at location 141 and/or the temperature of the cooling oil measured with temperature sensor 32 disposed within control loop 310. The controller 33 performs a control algorithm, an example of which is described below. As an output of the control algorithm the controller 33 generates signal C having "on"- and "off"-signals in order to switch on and turn off, respectively, valve 322 in cooling medium flow system 320.

The crosshead 50 is supplied with an elongate member 70 that is fed along direction 71 that is transversal to direction 13 of the polymer material flow. The crosshead 50 coates the elongate member 70 with the temperature controlled polymer material that is provided at the output of heat exchanger 30. The temperature of the melt polymer material within crosshead 50 that is measured through measurement sensor 51 is in a range that does not risk to adversely affect the desired characteristics of the elongate member 70.

In an embodiment, the elongate member 70 may be a group of one or more optical fibers like bare fibers or buffered fibers or fibers arranged in a fiber ribbon or a fiber ribbon stack, that are to be surrounded with a polymer sheath 72. In another embodiment, elongate member 70 may be an optical cable core that includes at least a buffer tube or a multitude of buffer tubes that comprise an optical fiber or a buffered optical fiber or an optical fiber ribbon or an optical fiber ribbon stack being surrounded with the polymer buffer tube sheath that are to be surrounded with a polymer jacket. In other embodiments, said cable core may be further provided with water swellable members and/or strength members and/or may be surrounded with a tape. The described cable core is surrounded by a cable jacket when passing through crosshead 50.

The polymer material supplied with tank 12 and finally extruded over the elongate member 70 as a sheath or jacket 72 may be high-density polyethylene (HDPE), but other suitable polymers are possible. The temperature in the extruder 50, for example, measured with temperature sensor 51 in the bulk material present within crosshead 50, may be at a temperature in the range of 150° C. to 200° C., more preferably between 170° C. to 180° C. Such temperature is suitable to avoid the elongate member 70 supplied to the crosshead 50 from sticking to the sheath or jacket 72 after being extruded over elongate member 70. Accordingly, the elongate member 70, which may include optical fibers or an optical fiber buffer tube or a cable core, can move and dispose itself within a certain extent relative to extruded sheath or jacket 72. Furthermore, the elongate member 70 is temperature sensitive because of the optical fibers disposed therein, and the polymer material extruded there over is in a range that will not substantially affect the optical characteristics of said optical fibers.

In order to achieve a temperature in the range of 150° C. to 200° C., more preferably between 170° C. to 180° C. of the polymer material, the temperature of the cooling oil in cooling loop 310 will be controlled to be in a range of about 120° C. to 150° C. by intermittent operation of control valve 322 operated by control signal C.

On the other hand, since the heat exchanger 30 removes heat from the polymer material provided at the end 141 of the extruder screw 11 and lowers the temperature of said polymer material, the extruder screw can be operated at a sufficiently high rotational speed so that sufficient polymer material is supplied to crosshead 50 and that the supply speed of the elongate member 70 along direction 71 can be sufficiently high in order to achieve reasonable utilization of the manufacturing equipment. The RPM of the extruder screw 11 can be in a range that achieves a temperature of up to 300° C. at location 141.

Without having a heat exchanger 30 that lowers the temperature of the polymer material before entering the crosshead 50, as with a conventional system, the apparatus risks sticking of the elongate member 70 to the sheath or jacket 72 extruded there over. If the elongate member 70 is an optical fiber core having optical transmission elements, in the conventional system, there is a risk that the optical transmission elements could stick to the extruded jacket 72 and degrade optical performance due to less flexibility when bending or looping. Furthermore, according to the conventional system, the high temperatures may also affect the optical characteristics of the optical wave guides themselves also.

Figure 2:
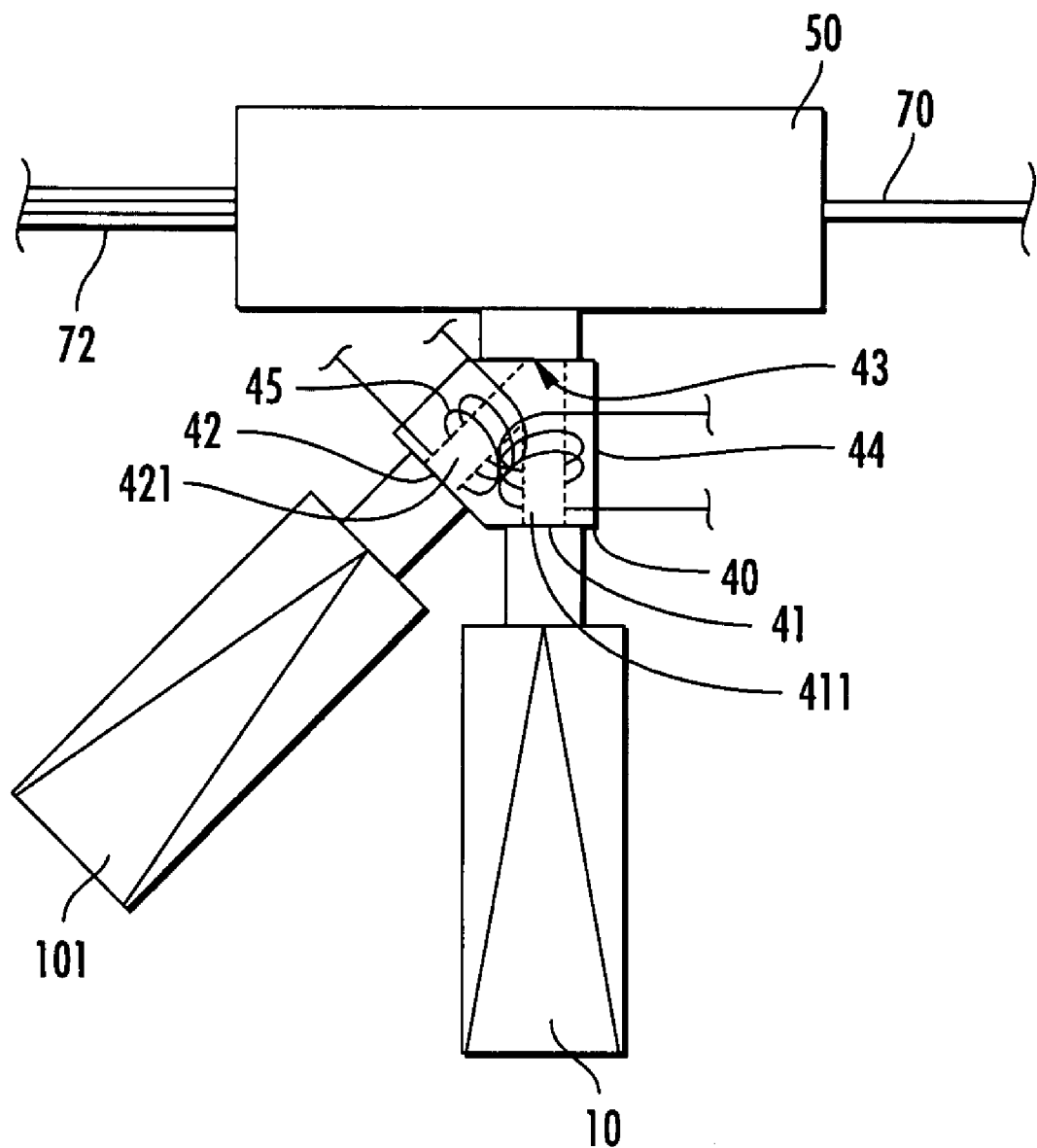
FIG. 2 shows an embodiment having two extruders that combine their polymer material flow to a single polymer material flow.

As shown in FIG. 2, the speed of supplying elongate member 70 can be further increased by combining the outputs of a first and a second extruder 10, 101 into a heat exchanger 40. Heat exchanger 40 has two inputs 41, 42, one of which coupled to the output of extruder 10, the other one coupled to the output of extruder 101. A first and a second flow path 411, 421 are connected to one of the inputs 41, 42, respectively. The paths 411, 421 are coupled with each other to achieve a single output 43 of the heat exchanger 40. A crosshead 50 is connected downstream to output 43. Each one of the flow paths 411, 421 is supplied with a coil 44, 45 of a cooling medium loop. Both coils 44, 45 can be connected to the same cooling medium flow loop.

The extruders 10, 101 can be operated with the same polymer material or with different polymer materials wherein both material flows are combined together at the single output 43 at the end of the heat exchanger 40. The extruder screw speeds of extruders 10 and 101 may be different or may be the same. They can be lower when compared to the single extruder embodiment of FIG. 1 while allowing the same supply speed for the elongate member 70. The heat exchanger 40 achieves a desired temperature at its output 43 which is controlled within a desired range or at a desired constant temperature. Having two extruders combined into one output 43 will reduce the pressure of the polymer material melt that may be, for example, at or less than 200 bar. The temperature is controlled such that it is sufficiently low so that the characteristics of elongate member 70 are not adversely affected. Especially if member 70 is a cable core including optical transmission elements, the temperature of the polymer material in crosshead 50 is in the range of 150° C. to 200° C. and, more preferably, between 170° C. and 180° C. for HDPE polymer material to be extruded over the cable core 70. The mentioned temperature ranges ensure that the optical characteristics of cable core 70 are not affected and avoid sticking of the cable core 70 to the extruded jacket 72 while maintaining a high manufacturing speed.

Figure 3:
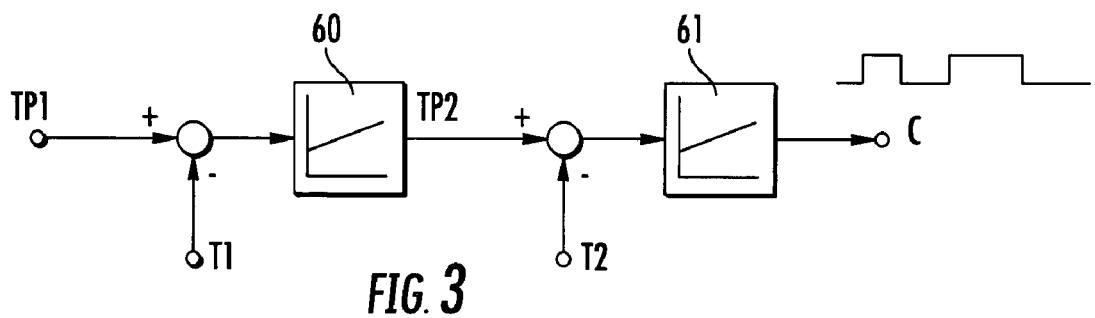
FIG. 3 shows a schematic representation of a control path that can be used in the embodiments of FIGS. 1 and 2.

A schematic representation of a control path that is performed in the embodiments shown in FIGS. 1 and 2 is depicted in FIG. 3. The control path includes a first controller 60 that is supplied with the difference of the actual temperature T1 measured with temperature sensor 51 in crosshead 50 and a preset temperature value TP1 which is the desired value of the temperature of the polymer melt in crosshead 50. The controller 60 may be a proportional controller. The controller 60 provides an output signal TP2 which has the function of a preset value for the temperature of the first cooling medium in closed cooling loop 310. A value T2 measured with temperature sensor 32 of loop 310 is compared with second preset value TP2, and the difference of TP2−T2 is supplied to the input of a second controller 61. Controller 61 may be another proportional controller. Controller 61 generates the control signal C that operates the on/off conditions of valve 322 in the second medium flow system 320. Signal C is an intermittent signal that has a suitable on/off sequence so that the temperature T1 measured with measurement sensor 51 in crosshead 50 comes close to the preset value TP1 and preferably will be identical to preset temperature TP1 in the steady state of operation of the production line.

A system for producing a fiber optic cable using one of the embodiments described above is shown in FIG. 4. In the embodiment, the elongate member 70 comprises three optical buffer tubes 701, 702, 703 that are paid off from a respective pay-off reel 7011, 7012, 7013. Each of the buffer tubes includes a group of optical fibers that is surrounded by a polymer sheath. A buffer tube including optical fibers may also be called a micro-module. The three micro-modules are SZ-stranded in a die 704 and are further supplied with swelling yarns 707 and a layer of dielectric strength members from a supply reel 705. The cable core can be provided with a tape (not shown). Combining all this into a cable core provides the elongate member 70 that is supplied to crosshead 50. Crosshead 50 extrudes a high-density polyethylene jacket over the cable core 70 resulting in cable 72. In order to solidify the HDPE jacket after extrusion, the cable 72 is cooled in a water trough 708. Thereafter, the manufactured cable is spooled onto a take-up reel 709. With the heat exchanger in place between extruder 10 and crosshead 50, the RPM of the extruder screw in extruder 10 can be operated at a high speed so as to achieve a high manufacturing speed for cable 72 without risking a degradation of the optical performance of the cable. The heat exchanger 30 keeps the temperature of the polymer melt that is extruded as cable jacket over the cable core 70 within a desired optimized range in a controlled manner so that a sticking of any elements 701, 702, 703, 705, 707 and the tape (not shown) to the cable jacket is avoided. The line speed for manufacturing the cable 72 may be maintained in an order of, for example, about 50 m/min without degrading the optical performance of cable 72.

Figure 5:
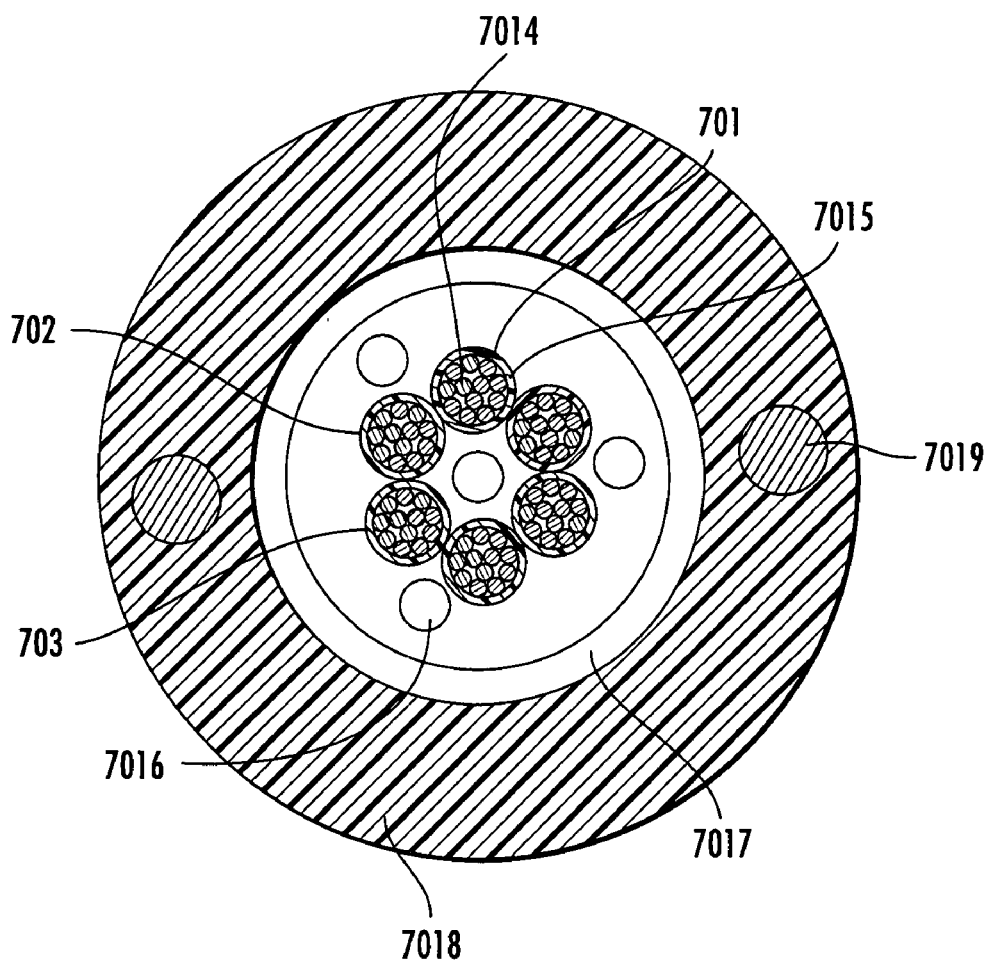
FIG. 5 shows an embodiment of an optical cable that is produced according to the system shown in FIG. 4.
Figure 4:
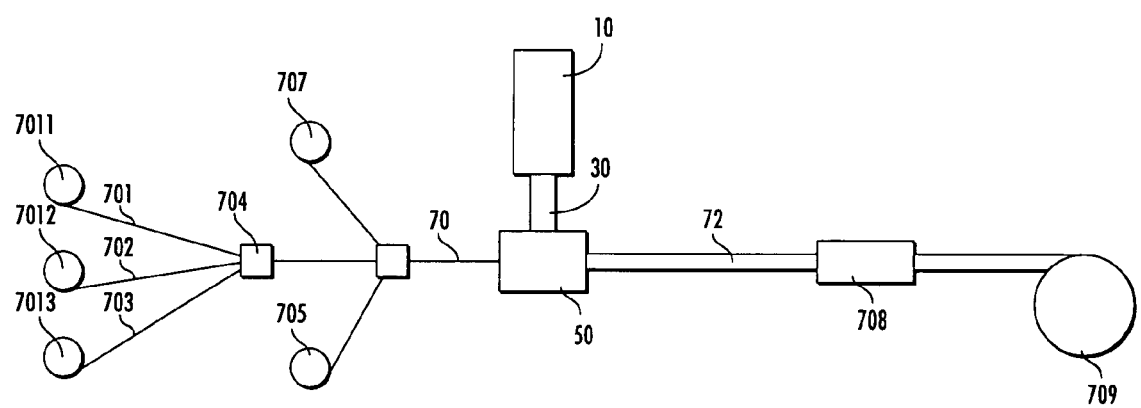
FIG. 4 shows an extruder system for manufacturing a fiber optic cable.

FIG. 5 depicts a cross-section of a cable that can be manufactured according to the manufacturing line shown in FIG. 4. The cable includes a number of six micro-modules or buffer tubes, three of which are labeled with reference numerals 701, 702, 703. Each of the micro-modules includes twelve optical fibers 7014 that are surrounded by a HDPE polymer sheath 7015. The micro-modules are SZ-stranded. The cable core includes four swelling yarns 7016 that serve for water blocking purpose. The core is surrounded with a layer of dielectric strength members that may be a layer of fiberglass yarns or aramid yarns. The cable core is surrounded with a cable jacket 7018 which is made of high-density polyethylene (HDPE). In the cable jacket, there are disposed two antibuckling strength elements 7019, e.g. made of glass fiber reinforced plastic.

The cable shown in FIG. 5 can be manufactured as shown in FIG. 4 in that the cable core is established as the elongate member 70 and supplied to the crosshead 50. Crosshead 50 extrudes the HDPE jacket 7018 over the cable core. Other cable configurations having a cable jacket are also suitable for the manufacturing with the extruder system as explained above. Furthermore, it is to be noted that crosshead 50 can also be used to extrude a sheath 7015 over the optical fiber 7014 in order to prefabricate one of the optical buffer tubes or micro-modules 701, 702, 703.

Many modifications and other embodiments of the present invention, within the scope of the appended claims, will become apparent to a skilled artisan. Therefore, it is to be understood that the invention is not to be limited to the specific embodiments disclosed herein and that modifications and other embodiments may be made within the scope of the appended claims. Although specific terms are employed herein, they are used in a generic and descriptive sense only and not for purposes of limitation.

We claim:

1. An apparatus for forming a sheath over an elongate member, comprising:
    an extruder having an output to supply a melt material having a temperature;
    a heat exchanger connected downstream the output of the extruder to remove heat from the melt material in a controlled manner to lower the temperature of the melt material passing through the heat exchanger before the melt material contacts an elongate member; and
    a crosshead connected downstream the heat exchanger to provide the elongate member comprising at least one optical fiber, with an extruded tubular sheath comprised of the melt material that surrounds the elongate member.

2. The apparatus according to claim 1, wherein the temperature of the melt material leaving an output of the heat exchanger is in a range that avoids a sticking of the sheath to the elongate member.

3. The apparatus according to claim 2, wherein the heat exchanger is located between the crosshead and the extruder.

4. The apparatus according to claim 1, wherein the heat exchanger comprises a least a channel for a medium to flow through the channel.

5. The apparatus according to claim 1, wherein the heat exchanger comprises an output to be connected downstream to an output of another extruder.

6. The apparatus according to claim 1, wherein the temperature of the melt material leaving an output of the heat exchanger is in a range that avoids a sticking of the sheath to the elongate member.

7. An apparatus for forming a sheath over an elongate member, comprising:
    an extruder having an output to supply a melt material having a temperature;
    a heat exchanger connected downstream the output of the extruder to one of add heat to and remove heat from the melt material in a controlled manner;
    a crosshead connected downstream the heat exchanger to provide an elongate member with a sheath that surrounds the elongate member;
    a closed first loop for a heat exchange medium coupled to the heat exchanger to one of add heat to or remove heat from the heat exchanger, said closed first loop being designed to achieve a temperature of the heat exchange medium within a predetermined range; and
    another loop of another heat exchanger medium thermally coupled to the first loop.

8. An apparatus for extruding a jacket over an elongate optical fiber core, comprising:
    an extruder to supply a polymer material at an elevated temperature, before the polymer material contacts an elongate optical fiber core;
    a crosshead; and
    a cooling system, said cooling system being connected between said extruder and said crosshead to supply said crosshead with the polymer material at a less elevated temperature, wherein said crosshead is designed to receive the elongate optical fiber core and dispose a tubular jacket made from the polymer material over said elongate optical fiber core.

9. The apparatus according to claim 8, wherein said cooling system comprises at least a cooling medium flow channel that is designed to remove heat from the polymer melt.

10. The apparatus according to claim 9, wherein the cooling system comprises a control loop that controls the temperature of the polymer material at an output of the cooling system within a predetermined range.

11. The apparatus according to claim 10, wherein the control loop comprises a first loop to circulate a first cooling medium, a second loop to provide another cooling medium, said second loop coupled to the first loop to transmit heat from the first loop to the other cooling medium of the second loop.

12. The apparatus according to claim 11, wherein the first loop comprises a pump to establish a continuous flow of the first cooling medium in the first loop and wherein the second loop comprises a valve to intermittently control a flow of the other cooling medium through the second loop.

13. The apparatus according to claim 8, comprising another extruder having an output for another polymer melt material at an elevated temperature, wherein the cooling system comprises a first input connected to an output of the extruder and another input connected to the output of said other extruder.

14. The apparatus according to claim 8, wherein the temperature of the polymer material leaving an output of the cooling system is in a range that avoids a sticking of the tubular jacket to the elongate optical fiber core.

15. An extruder system, comprising:
an extruder to provide a melt material at a temperature;
a heat exchanger coupled downstream the extruder to remove thermal energy from said melt material before said melt material contacts an elongate member;
a supply reel to supply the elongate member comprising at least one optical fiber; and
a tool designed to receive the elongate member and coupled downstream said heat exchanger to provide the elongate member with an extruded tubular sheath comprised of said melt material surrounding the elongate member.

16. The extruder system according to claim 15, further comprising a control path coupled to said heat exchanger to change the temperature of the melt material in a controlled manner.

17. The extruder system according to claim 16, wherein the control path includes a liquid medium channel to remove heat from said melt material.

18. The extruder system according to claim 17, wherein the control path is designed to substantially maintain the temperature of the material in a range from about 150 degrees Celsius to 200 degrees Celsius.

19. The extruder system according to claim 15, wherein the heat exchanger is located between the tool and the extruder.

* * * * *